United States Patent [19]

Fukuda et al.

[11] Patent Number: 4,725,900
[45] Date of Patent: Feb. 16, 1988

[54] APPARATUS EMPLOYING ADJUSTABLE MODULATION INDEX FOR REDUCING CROSS TALK BETWEEN RECORDED AUDIO AND VIDEO SIGNALS

[75] Inventors: Tokuya Fukuda, Tokyo; Masato Sekine, Kanagawa, both of Japan

[73] Assignee: Sony Corporation, Tokyo, Japan

[21] Appl. No.: 785,221

[22] Filed: Oct. 7, 1985

[30] Foreign Application Priority Data

Oct. 5, 1984 [JP] Japan .................... 59-209457

[51] Int. Cl.[4] .................... H04N 5/78; H04N 5/76
[52] U.S. Cl. .................... 360/19.1; 360/10.1; 358/343
[58] Field of Search .................... 360/19.1, 30, 10.1; 358/328, 330, 343

[56] References Cited

U.S. PATENT DOCUMENTS

| | | | |
|---|---|---|---|
| 4,486,793 | 12/1984 | Todd | 360/19.1 X |
| 4,490,753 | 12/1984 | Ito et al. | 360/19.1 |
| 4,492,986 | 1/1985 | Kono et al. | 360/19.1 X |
| 4,556,917 | 12/1985 | Shibata et al. | 360/19.1 X |
| 4,630,134 | 12/1986 | Kanamaru | 360/19.1 X |

FOREIGN PATENT DOCUMENTS 58-148585  9/1983  Japan .................... 360/30

Primary Examiner—Aristotelis M. Psitos
Attorney, Agent, or Firm—Lewis H. Eslinger; Alvin Sinderbrand

[57] ABSTRACT

Apparatus for recording audio and video signals comprises a signal processor for producing a processed video signal and a frequency-modulated audio signal. The frequency-modulated audio signal is obtained by frequency-modulating a carrier in response to an input audio signal. A magnetic recorder records both the frequency-modulated audio signal and the processed video signal in oblique tracks arranged successively on a magnetic tape. The recording is done selectively in a first recording mode wherein the oblique tracks are formed with spaces between successive tracks or a second recording mode wherein successive tracks are contiguous. A modulation control controls the frequency-modulation carried out by the signal processor to produce the frequency-modulated audio signal with a first modulation index in the first recording mode and with a second modulation index greater than the first modulation index in the second recording mode.

9 Claims, 12 Drawing Figures

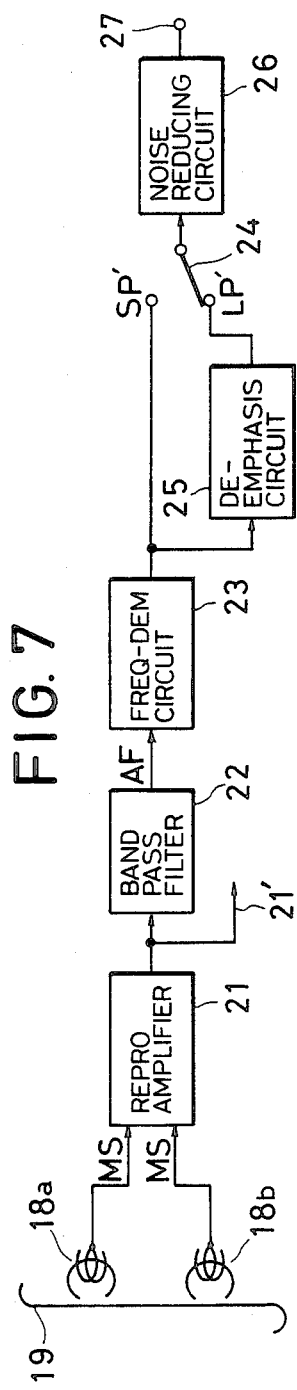
FIG. 7
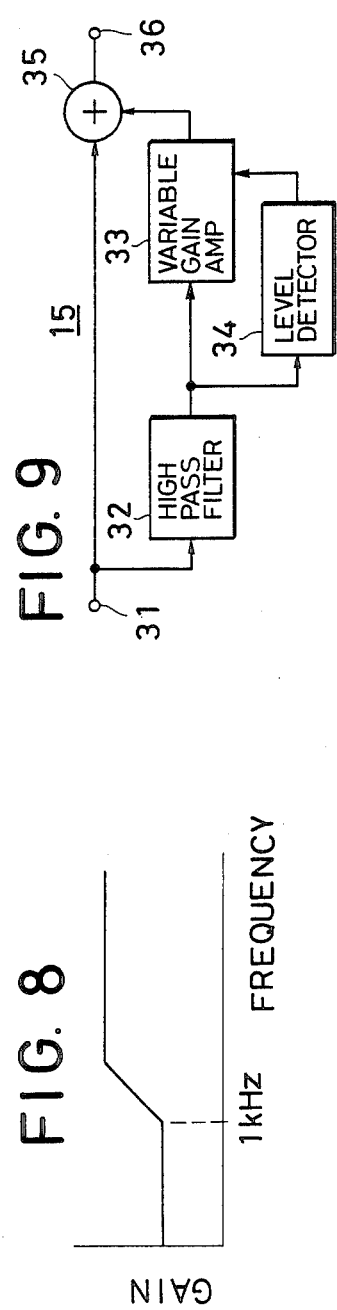
FIG. 9
FIG. 8

APPARATUS EMPLOYING ADJUSTABLE MODULATION INDEX FOR REDUCING CROSS TALK BETWEEN RECORDED AUDIO AND VIDEO SIGNALS

BACKGROUND OF THE INVENTION

1. Field of the Invention

This invention relates to apparatus for recording audio and video signals and, more particularly, to novel and highly-effective apparatus including a rotary magnetic head device for recording a frequency-modulated audio signal, together with a video signal, in successive oblique tracks on a magnetic tape.

2. Description of the Prior Art

A compact video tape recorder has been proposed for use with a magnetic tape having a width of eight millimeters. In such a compact video tape recorder, when recording a color television signal on the magnetic tape, a frequency-modulated audio signal is mixed with a processed color video signal. The frequency-modulated audio signal is produced by frequency-modulating a carrier with an audio signal. The processed color video signal is composed of a frequency-modulated luminance signal and a chrominance signal. The frequency-modulated luminance signal is produced by frequency-modulating an appropriate carrier with a luminance signal separated from the color television signal. The chrominance signal is also separated from the color television signal and is frequency-converted to a frequency band lower than the frequency band of the frequency-modulated luminance signal. The frequency-modulated audio signal is recorded, together with the processed color video signal, in oblique tracks on the magnetic tape by means including a rotary magnetic head.

In recording the frequency-modulated audio signal and the processed color video signal, two operational modes are selectively adopted in a compact video tape recorder. In one of these operational modes, which will be referred to as an SP recording mode, the speed at which the magnetic tape is transported is relatively high so that oblique tracks are formed on the magnetic tape with spaces or so-called guard bands between successive tracks. In the other of the operational modes, which will be referred to as an LP recording mode, the speed at which the magnetic tape is transported is reduced so that successive oblique tracks are positioned on the magnetic tape immediately adjacent to one another. In other words, in the second operational mode, the successive tracks are contiguous and the guard bands between adjacent tracks are eliminated.

In reproducing the recorded signal, cross talk is a problem where the signal has been recorded in the second operational mode described above. In particular, the problem of cross talk arises in respect of the frequency-modulated audio signal read from the magnetic tape in the reproduction mode. Cross talk is a problem with respect to the audio signal because of the relatively low frequency band of the frequency-modulated audio signal read from the magnetic tape and because of the overlap by the heads of at least one track adjacent to the track being scanned when reproducing signals that have been recorded in the LP recording mode.

In order to eliminate or minimize cross talk in the frequency-modulated audio signal reproduced from a magnetic tape on which the signal has been recorded in the LP recording mode, it has been proposed to record the frequency-modulated audio signal on the magnetic tape with respectively different carrier frequencies in successive oblique tracks. In a video tape recorder which is used with a magnetic tape having a width of a half inch, this enables reproduction of audio signals of improved quality. However, in such case, the frequency band of the frequency-modulated audio signal is expanded with the result that the frequency band of the processed video signal is to a degree suppressed (contracted). Further, the video tape recorder employing this technique has the disadvantage that the circuitry is complicated and the cost is increased. Consequently, such measures are not suitable for a compact video tape recorder used with a magnetic tape having a width of 8 millimeters.

OBJECTS AND SUMMARY OF THE INVENTION

An object of the invention is to provide apparatus for recording a frequency-modulated audio signal, together with a video signal, in oblique tracks arranged successively on a magnetic tape, which avoids the problems of the prior art described above.

Another object of the invention is to provide apparatus for recording a frequency-modulated audio signal, together with a video signal, in oblique tracks arranged successively on a magnetic tape, which apparatus can be placed selectively in a first recording mode in which the oblique tracks are formed on the magnetic tape with spaces or so-called guard bands between successive tracks and a second recording mode in which the oblique tracks are formed on the magnetic tape contiguously (i.e., without the guard bands), and by which apparatus the frequency-modulated audio signal is recorded in an improved manner in the second recording mode.

A further object of the invention is to provide apparatus of relatively simplified construction for recording a frequency-modulated audio signal, together with a video signal, in oblique tracks arranged successively on a magnetic tape, which apparatus can record the frequency-modulated audio signal in contiguous oblique tracks in such a manner that, in reproducing the signals recorded on the magnetic tape, a cross-talk component contained in a demodulated audio signal which is obtained by frequency-demodulating the frequency-modulated audio signal read from the magnetic tape is substantially minimized.

According to an aspect of the present invention, there is provided apparatus for recording audio and video signals; comprising: signal processing means for effecting frequency modulation of a carrier in response to an input audio signal to produce a frequency-modulated audio signal occupying a given frequency band and for producing a processed video signal including a frequency-modulated luminance signal occupying a frequency band on the upper side of the given frequency band; magnetic recording means for recording both the frequency-modulated audio signal and the processed video signal in oblique tracks arranged successively on a magnetic tape in a selected one of a first recording mode in which the tracks are formed on the magnetic tape with spaces between successive ones thereof and a second recording mode in which the tracks are formed contiguously on the magnetic tape; and modulation control means for controlling the signal processing means to produce the frequency-modulated audio signal with a first modulation index in the first recording mode and with a second modulation index greater than the first modulation index in the second recording mode.

BRIEF DESCRIPTION OF THE DRAWINGS

A better understanding of the objects, features and advantages of the invention can be gained from the following detailed description of the preferred embodiments thereof, in conjunction with the figures of the accompanying drawings, wherein like reference characters designate like parts, and wherein:

FIG. 7 is a block diagram showing an embodiment of apparatus for reproducing audio and video signals from a magnetic tape on which the audio and video signals are recorded by the embodiment shown in FIG. 6;

FIG. 8 is a diagram showing the gain-versus-frequency characteristic of one embodiment of an emphasis circuit used in the apparatus shown in FIG. 6;

FIG. 9 is a block diagram of another embodiment of the emphasis circuit used in the embodiment shown in FIG. 6;

DESCRIPTION OF THE PREFERRED EMBODIMENTS

Figure 1:
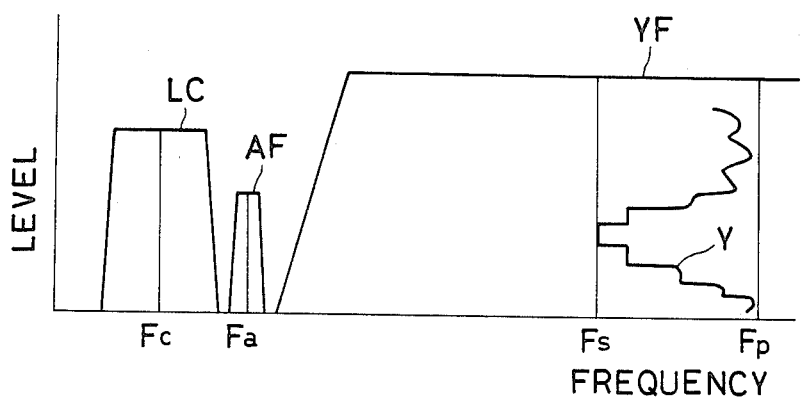
FIG. 1 is a diagram showing frequency spectra of a frequency-modulated audio signal, a frequency-modulated luminance signal, and a frequency-converted chrominance signal, to which references are made in explaining the recording of audio and color video signal in oblique tracks on a magnetic tape.

The frequency spectra of signals mixed for recording in oblique tracks on a magnetic tape are shown in FIG. 1. In the frequency spectra shown in FIG. 1 the axis of abscissae represents frequency and the axis of ordinates represents signal level. A frequency-modulated audio signal AF is positioned in the relatively narrow space between the upper boundary of the frequency band of a frequency-converted chrominance signal LC and the lower boundary of the frequency band of a frequency-modulated luminance signal YF extending into its lower sideband. A carrier frequency Fa of the frequency-modulated audio signal AF is selected to be, for example, 1.5 MHz. The frequency-converted chrominance signal LC has a color subcarrier frequency Fc of, for example, about 743 kHz, and the frequency-modulated luminance signal YF has a frequency deviation range obtained by a frequency modulation such that the leading edge of the synchronous signal of a luminance signal Y separated from the color television signal corresponds to a frequency Fs of, for example, 4.2 MHz, while the white peak (the maximum amplitude) of the luminance signal Y corresponds to a frequency Fp of, for example, 5.4 MHz. The frequency spectra shown in FIG. 1 are substantially the same as those shown in U.S. patent application Ser. No. 06/709,123, filed Mar. 7, 1985, and assigned to the assignee of the present application.

In recording the frequency-modulated audio signal and the processed color video signal, two operational modes SP and LP are selectively adopted in the compact video tape recorder, as explained above. In the first or SP recording mode, shown in FIG. 2, the speed at which the magnetic tape is transported is relatively high so that oblique tracks 1 are formed on the magnetic tape with guard bands 2 between successive tracks 1. In the second or LP recording mode, shown in FIG. 3, the speed at which the magnetic tape is transported is reduced so that successive oblique tracks 3 on the magnetic tape are contiguous and the guard bands between adjacent tracks 3 are eliminated.

In a concrete example, with a pair of rotary magnetic heads Ha and Hb each having a width of 15 microns, the oblique tracks 1, each of which has a width of 15 microns, have a pitch of 20.5 microns in the SP recording mode, and the oblique tracks 3, each of which has a width of 10 microns, have a pitch of 10 microns in the LP recording mode. Accordingly, in a reproduction mode wherein a magnetic tape on which a signal is recorded in the SP recording mode in accordance with the concrete example mentioned above is subjected to reproduction of signals, each of the rotary magnetic heads Ha and Hb having the width of 15 microns scans each of the oblique tracks 1 arranged on the magnetic tape with the pitch of 20.5 microns without overlapping another oblique track 1 adjacent thereto. On the other hand, in a reproduction mode wherein a magnetic tape on which a signal is recorded in the LP recording mode in accordance with the concrete example mentioned above is subjected to reproduction of signals, each of the rotary magnetic heads Ha and Hb having the width of 15 microns scans each of the oblique tracks 3 arranged on the magnetic tape with the pitch of 10 microns while overlapping at least one oblique track 3 adjacent thereto.

The rotary magnetic heads Ha and Hb which are used for both recording and reproducing of signals are provided with different air gap angles (head azimuth angles), so that a substantial azimuth loss is obtained in cross talk derived from the adjacent oblique tracks for the frequency-modulated luminance signal (which is in a relatively high frequency band) read from the magnetic tape, even when a magnetic tape on which a signal is recorded in the LP recording mode is subjected to reproduction of signals. Accordingly, the cross talk is minimized in respect of the frequency-modulated luminance signal read from the magnetic tape. However, the azimuth loss is not so pronounced in the case of cross talk derived from the adjacent oblique tracks for the frequency-converted chrominance signal (which is in a relatively low frequency band) read from the magnetic tape, so that other measures are adopted for minimizing the cross talk in respect of the frequency-converted chrominance signal read from the magnetic tape. For example, cross talk for the frequency-converted chrominance signal read from the magnetic tape is substantially eliminated by recording the frequency-converted chrominance signal on the magnetic tape with its carrier of a given phase in alternate oblique tracks and with its carrier reversed in phase at every horizontal period in other alternate oblique tracks, and restoring the carrier of a reproduced frequency-converted chrominance signal so as to have a predetermined phase and then passing it through a pectinated or comb characteristic filter.

Figure 2:
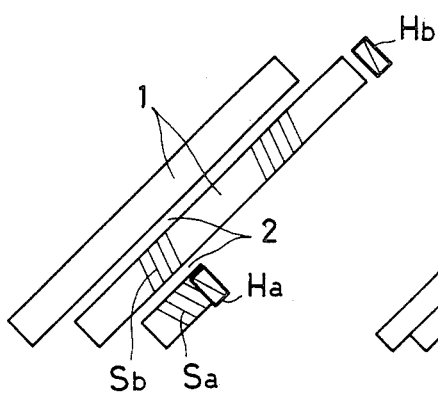
FIGS. 2 and 3 are diagrams showing arrangements of oblique tracks made on a magnetic tape by rotary magnetic heads in first and second modes of operation, respectively.
Figure 3:
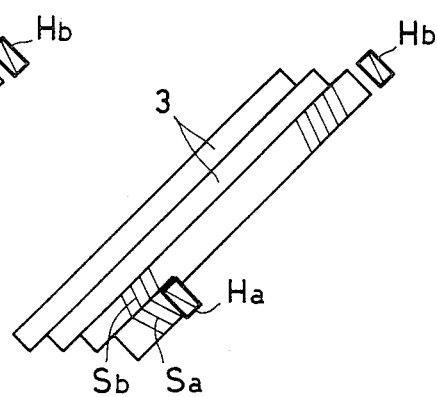

In FIGS. 2 and 3, horizontal synchronous pulses Sa and Sb are recorded in the oblique tracks 1 and 3, respectively, by the rotary magnetic heads Ha and Hb with the different head azimuth angles.

From one standpoint, it would seem to be desirable to obtain the frequency-modulated audio signal through frequency modulation with a relatively small modulation index in both the first and second recording modes, because the resulting frequency-modulated audio signal does not significantly suppress or restrict the frequency band of the processed video signal. However, when the magnetic tape on which the frequency-modulated audio signal and the processed video signal are recorded in the second recording mode is subjected to reproduction of signals, cross talk for the frequency-modulated audio signal read from the magnetic tape occurs at a relatively high level. It is therefore desirable that a relatively large modulation index be used in effecting frequency modulation to produce the frequency-modulated audio signal for recording in the second (LP) recording mode. This ensures that, in reproducing audio and video signals from the magnetic tape on which the frequency-modulated audio signal and the processed video signal are recorded in the second recording mode, the cross-talk component contained in the demodulated audio signal, namely in the reproduced audio signal that is obtained by frequency-demodulating the frequency-modulated audio signal read from the magnetic tape, is satisfactorily reduced. This reduction is worthwhile even though the frequency band of the processed video signal is subjected to a slightly increased suppression or restriction by the frequency-modulated audio signal.

In view of this, in apparatus constituted as described above in accordance with the present invention and operated to record in the second or LP mode, the frequency-modulated audio signal is produced through frequency modulation with the second modulation index, which is relatively large, by signal processing means under the control of modulation control means. This frequency-modulated audio signal is recorded, together with the processed video signal, on the magnetic tape by the magnetic recording means in the second recording mode. In a first embodiment of the invention, the frequency-modulated audio signal is produced through frequency modulation with the second modulation index in the second recording mode regardless of the frequency of the audio signal by which the predetermined carrier is frequency-modulated. In another embodiment, the frequency-modulated audio signal is produced through frequency modulation with the second modulation index only when the frequency of the audio signal is equal to or greater than a predetermined relatively high frequency in the second recording mode. This arrangement minimizes particularly the conspicuous cross talk contained in high-frequency components of a demodulated audio signal that is obtained by frequency-demodulating the frequency-modulated audio signal read from the magnetic tape in reproducing audio and video signals. This arrangement is preferable in view of the advantage that the frequency band of the processed video signal is subjected to reduced suppression by the frequency-modulated audio signal.

Generally, in reproduction of frequency-modulated signals from a magnetic tape, assuming that a desired frequency-modulated signal which is to be read from a certain oblique track is $A \cos \omega_c t$ and that cross talk derived from adjacent oblique tracks is $B \cos \omega t$, a reproduced frequency-modulated signal $f(t)$ is expressed as follows:

$$\begin{aligned} f(t) &= A\cos\omega_c t + B\cos \omega t \\ &= A\cos\omega_c t + B\cos(\omega_c + \Delta\omega)t \\ &= A\cos\omega_c t + B\cos\omega_c t \cdot \cos\Delta\omega t - B\sin\omega_c t \cdot \sin\Delta\omega t \\ &= A\left\{ \cos\omega_c t \left(1 + \frac{B}{A}\cos\Delta\omega t\right) - \frac{B}{A}\sin\Delta\omega t \cdot \sin\omega_c t \right\} \\ &= A\sqrt{\left(1 + \frac{B}{A}\cos\Delta\omega t\right)^2 + \left(\frac{B}{A}\sin\Delta\omega t\right)^2} X\cos\{\omega_c t + \phi(t)\} \end{aligned}$$

where
$$\Delta\omega = \omega - \omega_c$$

$$\phi(t) = \tan^{-1} \frac{\frac{B}{A}\sin\Delta\omega t}{1 + \frac{B}{A}\cos\Delta\omega t}$$

Accordingly, a demodulation output signal $g(t)$ as an ideal output is expressed as follows:

$$\begin{aligned} g(t) &= \frac{d}{dt}\{\omega_c t + \phi(t)\} \\ &= \omega_c + \frac{\frac{B}{A}\Delta\omega\left(\cos\Delta\omega t + \frac{B}{A}\right)}{1 + 2\frac{B}{A}\cos\Delta\omega t + \left(\frac{B}{A}\right)^2} \\ &\approx \omega_c + \frac{B}{A}\Delta\omega\cos\Delta\omega t \end{aligned}$$

As the equations set forth above reveal, the demodulation output sinal $g(t)$ contains a desired signal $\omega_c$ and a cross-talk component $\Delta\omega$.

Figure 5:
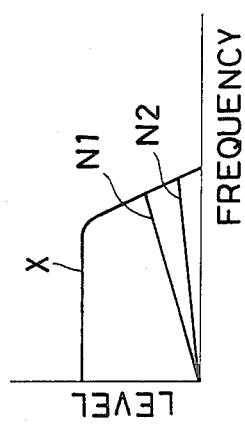
FIGS. 4 and 5 are diagrams showing frequency spectra of a signal reproduced by frequency-demodulating a frequency-modulated signal read from a magnetic tape and cross-talk components thereof, to which references are made in explaining the relation between the modulation index of the frequency-modulated signal and the level of the cross-talk components.
Figure 4:
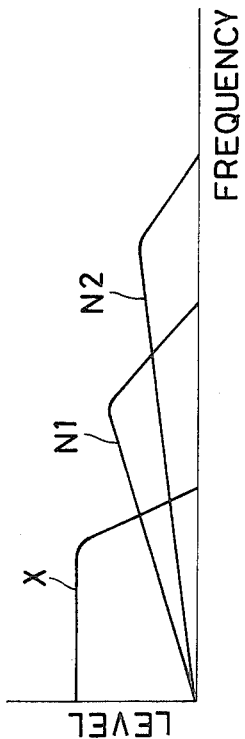

The frequency spectra of the desired signal $\omega_c$ and the cross-talk component $\Delta\omega$ are shown in FIG. 4, in which a curve X indicates the level of the desired signal $\omega_c$, a curve N1 indicates the level of the cross-talk component $\Delta\omega$ appearing in a case where the frequency-modulated signal produced by frequency modulation with a relatively small modulation index is recorded on the magnetic tape, and a curve N2 indicates the level of the cross-talk component $\Delta\omega$ appearing in a case where the frequency-modulated signal produced by frequency modulation with a relatively large modulation index is recorded on the magnetic tape. The case represented by the curve N1 may be referred to as a case of small modulation index, and the case represented by the curve N2 may be referred to as a case of large modulation index. FIG. 5 shows the frequency spectra of filtered output signals obtained from a low pass filter provided for extracting the desired signal $\omega_c$ from the demodulation output signal g(t). In FIG. 5, the curves X, N1 and N2 indicate the same respective levels as in FIG. 4.

As FIGS. 4 and 5 reveal, the cross talk component $\Delta\omega$ appearing in the case of large modulation index spreads broadly to a high frequency range (i.e., has a shallow slope of level against frequency), compared with the cross talk component $\Delta\omega$ appearing in the case of small modulation index. As a result, the level of the cross-talk component $\Delta\omega$ appearing in the case of large modulation index at the output of the low pass filter provided for extracting the desired signal $\omega_c$ is relatively low compared to the level of the cross-talk component $\Delta\omega$ appearing in the case of small modulation index at the output of the low pass filter. Consequently, a signal-to-noise ratio (S/N) of the desired signal $\omega_c$ obtained at the output of the low pass filter in the case of large modulation index is improved as compared to that in the case of small modulation index.

In the apparatus constituted as described above in accordance with the present invention, when the second recording mode LP in which contiguous oblique tracks are formed on the magnetic tape is established, the frequency-modulated audio signal is produced through frequency modulation with the second modulation index, which is relatively large. the frequency-modulated audio signal is recorded, together with the processed video signal, in the oblique tracks on the magnetic tape. Accordingly, when the magnetic tape on which the frequency-modulated audio signal, together with the processed video signal, is recorded in the second recording mode LP of apparatus according to the present invention is subjected to reproduction of signals, a cross-talk component contained in a demodulated audio signal which is obtained by frequency-demodulating the frequency-modulated audio signal read from the magnetic tape spreads broadly (i.e., with a shallow slope) to a high frequency range, and therefore the level of the cross-talk component in the frequency band of the demodulated audio signal is relatively low. This means that, in accordance with the present invention, a reproduced audio signal accompanied by a substantially reduced cross-talk component and having an improved signal-to-noise ratio is obtained from the magnetic tape on which the the frequency-modulated audio signal and the processed video signal are recorded in contiguous oblique tracks. Further, in such a case, since the frequency-modulated audio signal produced through frequency modulation with the second modulation index, namely the relatively large modulation index, is read from the magnetic tape and then frequency-demodulated, other noise incident generally to frequency modulation and frequency demodulation is also reduced.

Figure 6:
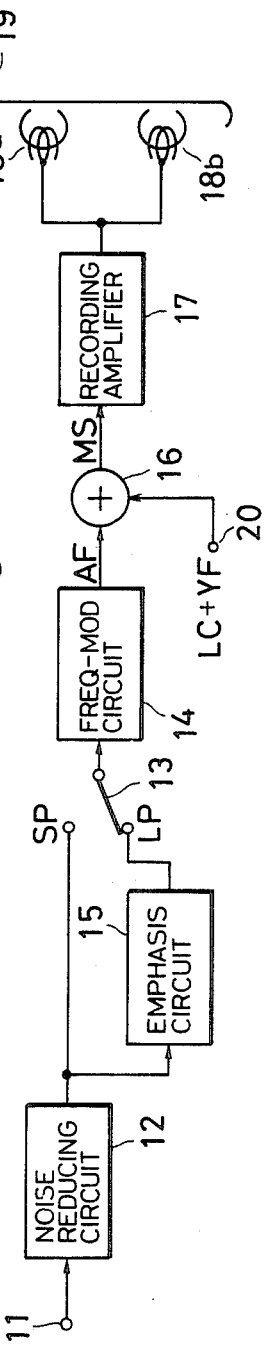
FIG. 6 is a block diagram showing an essential part of one embodiment of apparatus for recording audio and video signals according to the present invention.

FIG. 6 shows an essential part of one embodiment of apparatus for recording audio and video signals according to the present invention, and FIG. 7 shows an essential part of an embodiment of apparatus for reproducing audio and video signals recorded on a magnetic tape by the embodiment shown in FIG. 6. The structures of FIGS. 6 and 7 share a rotary magnetic head device. The recording and reproducing apparatus shown in FIGS. 6 and 7 is incorporated in a compact video tape recorder used with a magnetic tape having a width of 8 millimeters.

As FIG. 6 shows, an audio signal is supplied through an audio signal input terminal 11 to a noise reducing circuit 12. The dynamic range of the audio signal is suppressed for noise reduction in the noise reducing circuit 12, and the audio signal with the suppressed dynamic range is supplied both to a contact SP of a switch 13 and to an emphasis circuit 15. In the emphasis circuit 15, the level of the audio signal derived from the noise reducing circuit 12 is emphasized in a manner described below, and the audio signal having the emphasized level is supplied to a contact LP of the switch 13.

In the SP recording mode, wherein oblique tracks are formed on a magnetic tape with spaces or guard bands between successive ones thereof, the switch 13 is set to select the contact SP, and the audio signal obtained from the noise reducing circuit 12 is supplied directly through the switch 13 to a frequency-modulating circuit 14. In the frequency-modulating circuit 14, a carrier having a frequency, for example, of 1.5 MHz is frequency-modulated by the audio signal obtained from the noise reducing circuit 12 with a relatively small modulation index. For example, a frequency deviation within the range of about ±60 kHz may be employed. A frequency-modulated audio signal AF is thus obtained at the output of the frequency-modulating circuit 14 and is supplied to a mixing circuit 16.

On the other hand, in the LP recording mode, wherein contiguous oblique tracks are formed on a magnetic tape, the switch 13 is set to select the contact LP, and the audio signal having the emphasized level obtained from the emphasis circuit 15 is supplied through the switch 13 to the frequency-modulating circuit 14. In this case, in the frequency-modulating circuit 14, a carrier having a frequency, for example, of 1.5 MHz is frequency-modulated with a relatively large modulation index by the audio signal of emphasized level obtained from the emphasis circuit 15. Such relatively large modulation index is larger than that employed in the SP recording mode. A frequency-modulated audio signal AF is thus obtained at the output of the frequency-modulating circuit 14 and is supplied to the mixing circuit 16.

Meanwhile, a processed color video signal LC+YF composed of the frequency-converted chrominance signal LC and the frequency-modulated luminance signal YF is also supplied to the mixing circuit 16 through a video signal terminal 20. As previously mentioned, the frequency-converted chrominance signal LC has a color subcarrier frequency of, for example, about 743 kHz, and the frequency-modulated luminance signal YF has a frequency deviation resulting from a frequency modulation such that the leading edge of the synchronous signal of an original luminance signal corresponds to a frequency of, for example, 4.2 MHz, while the white peak (the maximum amplitude) of the original luminance signal corresponds to a frequency of, for example 5.4 MHz.

The frequency-modulated audio signal AF is located in a relatively narrow frequency band lying between the frequency bands of the frequency-converted chrominance signal LC and the frequency-modulated luminance signal YF. In the mixing circuit 16, the frequency-modulated audio signal AF is mixed with the processed color video signal LC±YF so as to produce a mixed signal MS. The mixed signal MS obtained from the mixing circuit 16 is supplied through a recording amplifier 17 to a pair of rotary magnetic heads 18a and 18b. The recording heads 18a and 18b have different azimuth angles and are rotated to scan alternately a magnetic tape 19 so as to form (record) on the magnetic tape 19 successive oblique tracks arranged with spaces or guard bands between successive ones thereof in the SP recording mode and also to form (record) on the magnetic tape 19 successive contiguous oblique tracks in the LP recording mode.

In the reproducing apparatus shown in FIG. 7, the rotary magnetic heads 18a and 18b, which may be the same as the heads 18a and 18b of FIG. 6, alternately scan the oblique tracks on the magnetic tape 19 to read the mixed signal MS therefrom. Each of the oblique tracks is traced by the same rotary magnetic head 18a or 18b that was used in forming the track. Thus the azimuth angle employed in the reproduction of the mixed signal MS as recorded on a particular track is the same as the azimuth angle that was employed in the recording of the mixed signal MS on the same track.

The mixed signal MS read from the respective oblique tracks on the magnetic tape 19 by each of the rotary magnetic heads 18a and 18b alternately is supplied to a reproducing amplifier circuit 21 and formed into a continuous signal therein. The mixed signal MS derived from the reproducing amplifier circuit 21 is supplied to a band pass filter 22. The frequency-modulated audio signal AF is extracted by the band pass filter 22 and supplied to a frequency-demodulating circuit 23 wherein it is subjected to frequency demodulation. As a result of this frequency demodulation, a demodulated audio signal is obtained at the output of the frequency-demodulating circuit 23.

The demodulated audio signal is supplied both to a contact SP' of a switch 24 and to a de-emphasis circuit 25. In the de-emphasis circuit 25, the level of the demodulated audio signal derived from the frequency-demodulating circuit 23 is de-emphasized as described below, and the demodulated audio signal having the de-emphasized level is supplied to a contact LP' of the switch 24.

In a first reproduction mode, the magnetic tape 19 is scanned by the rotary magnetic heads 18a and 18b with the switch 24 set to select the contact SP'. This reproduction mode corresponds to the recording mode in which the mixed signal MS is recorded by the apparatus of FIG. 6 in the SP recording mode. The reproduced audio signal obtained from the frequency-demodulating circuit 23 is supplied directly through the switch 24 to a noise reducing circuit 26. On the other hand, in a second reproduction mode, the magnetic tape 19 is scanned by the rotary magnetic heads 18a and 18b with the switch 24 set to select the contact LP'. This reproduction mode corresponds to the recording mode in which the mixed signal MS is recorded by the apparatus of FIG. 6 in the LP recording mode. The reproduced audio signal having the de-emphasized level obtained from the de-emphasis circuit 25 is supplied through the switch 24 to the noise reducing circuit 26.

In the noise reducing circuit 26, the dynamic range of the demodulated audio signal is expanded so as to reduce noise components contained in the demodulated audio signal, and the demodulated audio signal having been subjected to noise reduction in the noise reducing circuit 26 is supplied to an audio signal output terminal 27 as a reproduced audio signal.

The mixed signal MS derived from the reproducing amplifier circuit 21 in the form of a continuous signal is also supplied (as indicated at 21') to a video signal processing circuit (not shown in the drawings) in which the frequency-converted chrominance signal LC is frequency-converted again to the original frequency band so as to constitute a reproduced chrominance signal, and the frequency-modulated luminance signal YF is frequency-demodulated to produce a reproduced luminance signal.

In FIG. 6, the emphasis circuit 15 is constructed, for example, to emphasize uniformly the level of the audio signal derived from the noise reducing circuit 12 regardless of the frequency of the audio signal, so that the level of the whole frequency component of the audio signal is uniformly increased. Accordingly, in the LP recording mode, the modulation index for the frequency modulation carried out in the frequency-modulating circuit 14 is uniformly increased to, for example, about 1.5 times the value it has in the SP recording mode, regardless of the frequency of the audio signal which is supplied to the frequency-modulating circuit 14 as a frequency-modulation signal. In connection with such an arrangement for the emphasis circuit 15, the de-emphasis circuit 25 provided in the reproducing apparatus shown in FIG. 7 is arranged to de-emphasize uniformly the level of the demodulated audio signal obtained from the frequency-demodulating circuit 23 regardless of the frequency thereof, so that the level of the whole frequency component of the demodulated audio signal is uniformly reduced.

In another embodiment of apparatus according to the present invention, the emphasis circuit 15 is arranged to have the gain-frequency characteristic shown in FIG. 8 so as to emphasize uniformly the level of the frequency components of the audio signal higher than about 1 kHz. In such a case, when the LP recording mode is established, the modulation index for the frequency modulation carried out in the frequency-modulating circuit 14 is uniformly increased to, for example, about 1.5 times the value it has in the SP recording mode only when the frequency of the audio signal which is supplied to the frequency-modulating circuit 14 is higher than about 1 kHz. In the case where the emphasis circuit 15 of FIG. 6 emphasizes uniformly the level of the frequency component of the audio signal higher than about 1 kHz, the de-emphasis circuit 25 provided in the reproducing apparatus shown in FIG. 7 is constructed to de-emphasize uniformly the level of the demodulated audio signal obtained from the frequency-demodulating circuit 23 only when the frequency of the modulated audio signal is higher than about 1 kHz.

In a further embodiment of apparatus according to the present invention, the emphasis circuit 15 is constructed to emphasize the level of frequency components higher than a predetermined frequency of the audio signal to a degree inversely proportional to the decrease in level of such frequency components. In this case, when the LP recording mode is established, the modulation index for the frequency modulation effected by the frequency-modulating circuit 14 is increased in such a manner that the lower the level of the audio signal which is supplied to the frequency-modulating circuit 14 is, the greater the modulation index is, but only to the extent that the frequency of the audio signal is higher than the predetermined frequency.

FIG. 9 shows an embodiment of the configuration of the emphasis circuit 15 used in the further embodiment as mentioned above.

In the emphasis circuit 15 shown in FIG. 9, the audio signal derived from the noise reducing circuit 12 is supplied through an input terminal 31 to a high pass filter 32. Frequency components of the audio signal higher than, for example, 1 kHz are extracted by a high pass filter 32 and supplied to a voltage controlled variable gain amplifier 33 to be amplified thereby. The frequency components higher than 1 kHz extracted by the high pass filter 32 are supplied also to a level detector 34. In the level detector 34, the level of the frequency components higher than 1 kHz is detected, and a detection output voltage varying in proportion to the detected level is produced. The detection output voltage obtained from the level detector 34 is supplied to the gain control terminal of the voltage controlled variable gain amplifier 33 so that the gain thereof is caused to vary in inverse proportion to the level of the frequency components higher than 1 kHz. Accordingly, an amplified output of the frequency components higher than 1 kHZ, which has the level increased in a manner inversely proportional to the decrease in level of the frequency components higher than 1 kHz extracted by the high pass filter 32, is obtained from the voltage controlled variable gain amplifier 33. This amplified output of the frequency components higher than 1 kHz is added to the audio signal supplied through the input terminal 31 by a mixing circuit 35 to produce an emphasized audio signal, and the emphasized audio signal is supplied through an output terminal 36 to the contact LP of the switch 13.

Figure 10:
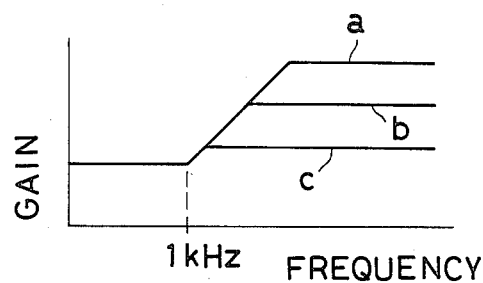
FIG. 10 is a diagram showing the gain-versus-frequency characteristic of the emphasis circuit shown in FIG. 9.

The emphasis circuit 15 thus constituted has the gain-frequency characteristic shown in FIG. 10 for emphasizing the level of the audio signal. That is, the gain of the emphasis circuit 15 varies in accordance with a curve a in FIG. 10 when the level of the frequency components of the audio signal higher than about 1 kHz is relatively low, with a curve b in FIG. 10 when the level of the frequency components of the audio signal higher than about 1 kHz is of an intermediate value, and with a curve c in FIG. 10 when the level of the frequency components of the audio signal higher than about 1 kHz is relatively high. In the LP recording mode, the emphasized audio signal obtained from the output terminal 36 of the emphasis circuit 15 shown in FIG. 9 is supplied through the switch 13 to the frequency-modulating circuit 14 as a frequency-modulating signal, and therefore the modulation index for the frequency modulation effected by the frequency-modulating circuit 14 is increased in such a manner that the lower the level of the audio signal which is supplied to the frequency-modulating circuit 14 is, the larger the modulation index is, but only to the extent that the frequency of the audio signal is higher than about 1 kHz.

In a still further embodiment of apparatus according to the present invention, the emphasis circuit 15 is arranged to emphasize the level of the audio signal when the level of the audio signal is relatively low or of an intermediate value. In this case, when the LP recording mode is established, the modulation index for the frequency modulation effected by the frequency-modulating circuit 14 is increased to be, for example, about 1.5 to 2.0 times as great as that in the SP recording mode in the situation wherein the level of the audio signal is relatively low or of an intermediate value, and is reduced from this augmented value in the situation wherein the level of the audio signal is relatively high. In other words, the level emphasizing means comprises level modifying means for modifying the level of the input audio signal so that, when the level of the input audio signal is relatively high, the second modulation index has a value reduced as compared to the value thereof when the level of the input audio signal is relatively low.

Figure 11:
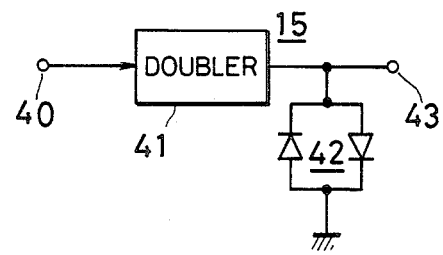
FIG. 11 is a block diagram showing another embodiment of the emphasis circuit used in the embodiment shown in FIG. 6.

FIG. 11 shows an embodiment of the emphasis circuit 15 used in the still further embodiment described above.

In the emphasis circuit 15 shown in FIG. 11, the audio signal derived from the noise reducing circuit 12 is supplied through an input terminal 40 to a doubler 41. The level of the audio signal is doubled in the doubler 41 and then limited by a limiter 42 to be equal to or lower than a predetermined limiting level. A modified audio signal having the level doubled and limited is thus obtained at an output terminal 43 and supplied to the contact LP of the switch 13.

Figure 12:
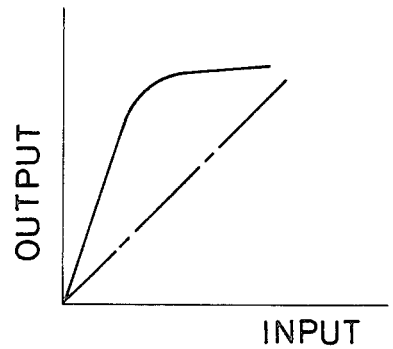
FIG. 12 is a diagram showing the out-put-versus-input characteristic of the emphasis circuit shown in FIG. 11.

With this emphasis circuit 15, the input-output characteristic indicated by a solid line in FIG. 12 is obtained. In FIG. 12, a linear input-output characteristic is also shown with a dot-dash line for the purpose of comparison. In the LP recording mode, the audio signal is modified in its level by the emphasis circuit 15 having the input-output characteristic shown in FIG. 12 and supplied to the output terminal 43. From there it is supplied through the switch 13 (FIG. 6) to the frequency-modulating circuit 14 as a frequency-modulating signal. As a result, the modulation index for the frequency modulation carried out in the frequency-modulating circuit 14 is increased to, for example, a value about 1.5 to 2.0 times as great as that in the SP recording mode when the level of the audio signal is relatively low or of an intermediate value, and reduced from this augmented value when the level of the audio signal is relatively high.

It is possible to position a portion of the apparatus of FIG. 6 including the emphasis circuit 15 and the switch 13 on the input side of the noise reducing circuit 12. Similarly, it is possible to position a portion of the reproducing apparatus of FIG. 7 including the de-emphasis circuit 25 and the switch 24 on the output side of the noise reducing circuit 26.

Further, although the level of the audio signal is emphasized in order to increase the modulation index for the frequency modulation carried out in the frequency-modulating circuit 14 in the embodiment shown in FIG. 6, the present invention is not limited to such an embodiment. For example, the frequency deviation characteristic of the frequency-modulating circuit 14 may be changed so as to increase the modulation index for the frequency modulation carried out in the frequency-modulating circuit 14 in the LP recording mode, without emphasizing the level of the audio signal. Similarly, in the reproducing apparatus shown in FIG. 7, the frequency-demodulation characteristic of the frequency-demodulating circuit 23 may be changed so as to reduce the level of the demodulated audio signal in the reproducing mode wherein a magnetic tape on which the frequency-modulated audio signal and the processed video signal are recorded in the LP recording mode established in the embodiment shown in FIG. 6 is scanned by the rotary magnetic heads 18a and 18b, without de-emphasizing the level of the demodulation audio signal.

Many other embodiments of the invention will readily occur to those skilled in the art upon consideration of this disclosure. Accordingly, the invention is not limited except by the appended claims.

What is claimed is:

1. Apparatus for recording audio and video signals; comprising:
   signal processing means for effecting frequency modulation of a carrier in response to an input audio signal to produce a frequency-modulated audio signal occupying a given frequency band and for producing a processed video signal including a frequency-modulated luminance signal occupying a frequency band on the upper side of said given frequency band;

magnetic recording means for recording both said frequency-modulated audio signal and said processed video signal in oblique tracks arranged successively on a magnetic tape in a selected one of a first recording mode in which said tracks are formed on said magnetic tape with spaces between successive ones thereof and a second recording mode in which said tracks are formed contiguously on said magnetic tape; and modulation control means for controlling said signal processing means to produce said frequency-modulated audio signal with a first modulation index in said first recording mode and with a second modulation index greater than said first modulation index in said second recording mode.

2. Apparatus according to claim 1; wherein said modulation control means comprises level emphasizing means for emphasizing the level of said input audio signal to produce an emphasized audio signal for frequency modulation of said carrier in said second recording mode.

3. Apparatus according to claim 2; wherein said level emphasizing means comprises frequency responsive means for controlling said signal processing means to produce said frequency-modulated audio signal with said second modulation index only when said carrier is frequency-modulated in response to a frequency component higher than a predetermined frequency of said input audio signal in said second recording mode.

4. Apparatus according to claim 3; wherein said predetermined frequency is selected to be about 1 kHz.

5. Apparatus according to claim 3; wherein said level emphasizing means further comprises level responsive means operative to vary said second modulation index in such a manner that the lower the level of said frequency component is, the greater said second modulation index is.

6. Apparatus according to claim 5; wherein said level emphasizing means increases the level of said frequency component to produce an emphasized audio signal used for frequency modulation of said carrier in said second recording mode.

7. Apparatus according to claim 6; wherein said level emphasizing means comprises a high pass filter for extracting said frequency component from said input audio signal, a level detector for detecting the level of said frequency component and producing a detection output varying in response to the detected level therein, a variable gain amplifier for amplifying said frequency component, the gain of said variable gain amplifier being controlled in accordance with said detection output, and a mixing circuit for mixing an output of said variable gain amplifier with said input audio signal so as to produce said emphasized audio signal.

8. Apparatus according to claim 2; wherein said level emphasizing means comprises level modifying means for modifying the level of said input audio signal so that, when the level of said input audio signal is relatively high, said second modulation index has a value reduced as compared to the value thereof when the level of said input audio signal is relatively low.

9. Apparatus according to claim 8; wherein said level modifying means comprises a doubler for doubling the level of said input audio signal and producing a doubled output signal and a limiter for limiting said doubled output signal to a value less than a predetermined level.

* * * * *